United States Patent [19]

Tateyama et al.

[11] Patent Number: 4,707,635
[45] Date of Patent: Nov. 17, 1987

[54] CATHODE RAY TUBE HAVING A FLUORESCENT LAYER WITH VARYING AMOUNTS OF SILICA

[75] Inventors: Norihiro Tateyama, Saitama; Kazuo Yamazaki, Aichi; Hiroshi Kato, Kanagawa; Haruhito Teshima, Tokyo, all of Japan

[73] Assignee: Sony Corporation, Tokyo, Japan

[21] Appl. No.: 844,157

[22] Filed: Mar. 26, 1986

[30] Foreign Application Priority Data

Mar. 26, 1985 [JP] Japan .................................. 60-61563

[51] Int. Cl.⁴ ........................ H01J 29/18; H01J 29/28
[52] U.S. Cl. .................................... 313/466; 313/467; 313/473; 252/301.4 F
[58] Field of Search ....................... 313/466, 467, 473; 252/301.4 F, 301.6 F

[56] References Cited

U.S. PATENT DOCUMENTS 4,103,069  7/1978  Schulze et al. ................ 313/467 X

FOREIGN PATENT DOCUMENTS 141149  11/1981  Japan ................................... 313/466

Primary Examiner—David Moore
Assistant Examiner—K. Wieder
Attorney, Agent, or Firm—Hill, Van Santen, Steadman & Simpson

[57] ABSTRACT

A cathode ray tube having a face plate including a fluorescent screen formed on the inner surface of the face plate. A conventional metal backing layer backs up the fluorescent screen. The improvements of the present invention are involved with the composition of the fluorescent material composition which includes fluorescent particles and not less than 0.6 parts by weight of $SiO_2$ per 100 parts by weight of fluorescent particles in that portion of the material which contacts the face plate, the amount of $SiO_2$ being insufficient to cause the brightness of the fluorescent particles to deteriorate, and not more than 0.3 parts by weight of $SiO_2$ per 100 parts by weight of fluorescent particles in that portion of the fluorescent material which faces the metal backing layer.

5 Claims, 3 Drawing Figures

CATHODE RAY TUBE HAVING A FLUORESCENT LAYER WITH VARYING AMOUNTS OF SILICA

BACKGROUND OF THE INVENTION

1. Field of the Invention

The present invention is in the field of cathode ray tubes, and more specifically, relates to an improved fluorescent screen formed on the inner surface of the face plate.

2. Description of the Prior Art

Several types of projectors have been suggested for enlarging and projecting an image of a cathode ray tube on a screen. The most common type of projector uses a so-called projection type display. The cathode ray tube for the projector is usually energized at a level of approximately 15 to 20 times that of ordinary color cathode ray tubes, thereby causing the fluorescent material of the screen to emit higher intensity light. With a small size projector tube, however, the power required may be so high that the fluorescent material layer is likely to separate from the face plate by the action of the electron beam energy applied.

In a typical cathode ray tube structure of the prior art, the outer surface of the tube constitutes a face plate and a fluorescent material layer is formed on the inner surface of the face plate. A metal backing layer is usually provided behind the fluorescent screen, and is formed by vacuum deposition. An intermediate layer such as an acrylic resin is usually interposed between the back of the fluorescent screen and the front of the metal backing layer. This type of fluorescent screen, as previously mentioned, has disadvantages when used as a projector of the type mentioned.

SUMMARY OF THE INVENTION

The present invention provides a cathode ray tube having an improved fluorescent screen which substantially eliminates the problem of separation on the face of the tube.

The present invention also provides a cathode ray tube in which the metal backing layer formed on the fluorescent screen is rendered free from deterioration with moisture.

Another feature of the present invention is the provision of a cathode ray tube which is particularly suitable for use in a color projector requiring high electrical power.

In accordance with the present invention, there is provided a cathode ray tube having a face plate, a fluorescent screen on the inner surface of the face plate, and a metal backing layer behind the fluorescent screen, usually including an intermediate layer of an acrylic resin or the like. In keeping with the present invention, the fluorescent screen in that portion which contacts the face plate contains not less than 0.6 parts by weight of finely divided $SiO_2$ per 100 parts by weight of the fluorescent particles, the amount of $SiO_2$ being insufficient, however, to deteriorate the brightness of the particles. That portion of the fluorescent screen which faces the metal backing layer contains not more than 0.3 parts by weight of $SiO_2$ per 100 parts by weight of the fluorescent particles, and may be entirely free of $SiO_2$. The fluorescent screen preferably consists of two discrete layers including one layer which contacts the face plate and contains $SiO_2$ in an amount not less than 0.6 parts by weight per 100 parts by weight of the fluorescent material, and the second layer which is immediately adjacent to the first layer and having a content of $SiO_2$ not larger than 0.3 parts by weight per 100 parts by weight of fluorescent particles, or the second layer may be completely free of $SiO_2$.

DESCRIPTION OF THE PREFERRED EMBODIMENTS

Figure 3:
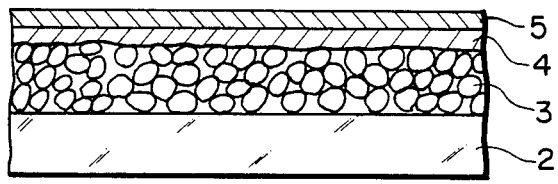
FIG. 3 is a similar cross-sectional view illustrating a prior art fluorescent screen.

Turning first to FIG. 3, there is shown a typical fluorescent screen of a conventional cathode ray tube which comprises a face plate 2, a fluorescent material layer 3 formed on the inner surface of the face plate, and a metal backing layer 5 formed by vacuum deposition and located behind the fluorescent layer 3. An intermediate layer 4 composed, for example, of an acrylic resin is interposed between the fluorescent material 3 and the metal backing 5. This type of fluorescent screen, as described, does not function satisfactorily for projecting images under conditions of high power.

In order to prevent the separation of the fluorescent material layer 3 from the face plate 2, we made an attempt to add $SiO_2$ powder to the fluorescent material layer 3. With the addition of the $SiO_2$ powder, the adhesion between the fluorescent material layer 3 and the face plate 2 was improved but the fluorescent material layer 3 became too smooth on the surface thereof, leading to the problem that the metal backing layer 5 of aluminum was more liable to separate. In addition, since $SiO_2$ powder has a high moisture absorption, the aluminum backing layer 5 was attacked, causing black-point defects.

Figure 1:
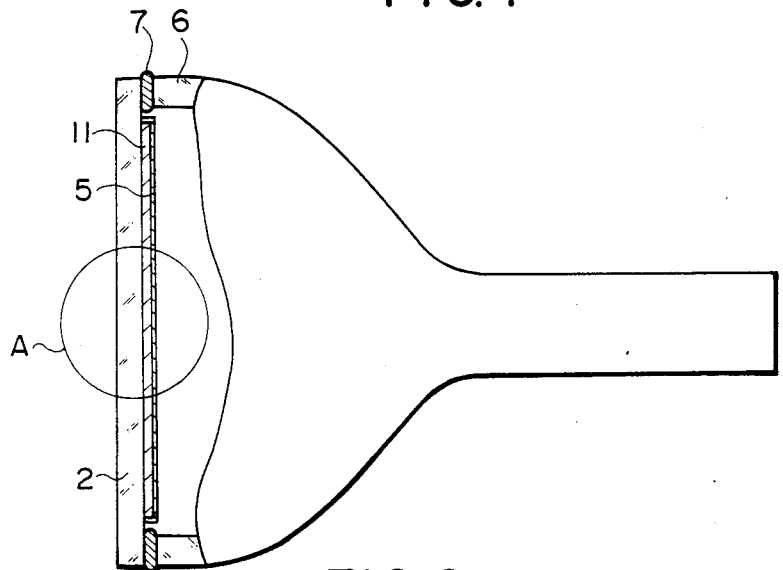
FIG. 1 is a side elevational view, with portions broken away, illustrating an overall cathode ray tube structure according to the present invention.
Figure 2:
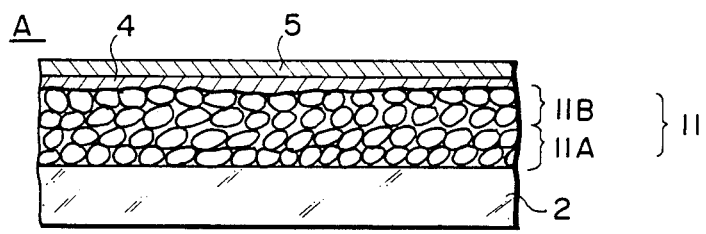
FIG. 2 is an enlarged sectional view of the area indicated at A in FIG. 1.

In accordance with the present invention, shown in FIGS. 1 and 2, a cathode ray tube 1 comprising a face plate 2 has a fluorescent screen 11 on the inner surface of the face plate 2. The fluorescent screen 11 is covered with a metal backing layer 5 such as one composed of aluminum. The face plate 2 is bonded to a funnel-shaped portion 6 of the tube 1 through a frit sealer 7 along the periphery of the face plate 2.

In accordance with the present invention, the fluorescent screen 11 is in the form of a layer whose characteristics on opposite sides differ. One side 11A of the screen 11 which contacts the face plate 2 includes not less than 0.6 parts by weight of $SiO_2$ per 100 parts by weight of the fluorescent particles in the screen 11. The second side, 11B, which faces the metal backing layer 5, is free of $SiO_2$ or includes not more than 0.3 parts by weight of $SiO_2$ per 100 parts by weight of the fluorescent particles. The upper limit of the $SiO_2$ content at the first side which contacts the face plate 2 is such that the fluorescent screen 11 is not deteriorated with respect to brightness thereof by the addition of the $SiO_2$. The other side 11B may be formed with the metal backing layer 5 through an intermediate layer 4 such as a conventional acrylic resin layer as shown in FIG. 2.

Since the fluorescent screen 11 contains $SiO_2$ in amounts not less than 0.6 parts by weight at the side 11A contacting the face plate 2, good adhesion to the face plate 2 is insured. On the other hand, the other side 11B of the fluorescent screen 11 facing the metal backing layer 5 is free of $SiO_2$ or has an $SiO_2$ content not greater than 0.3 parts by weight per 100 parts of the fluorescent particles so that the surface has suitable irregularities and the adhesion between the metal backing layer 5 and the fluorescent screen 11 is high. At the same time, the second side 11B has smaller amounts of $SiO_2$ and thus has a reduced moisture absorption so that the metal backing layer 5 is not undesirably attacked.

The fabrication of the fluorescent screen 11 can be accomplished as follows. First, a fluorescent paste is made up which contains not less than 0.6 parts by weight $SiO_2$ per 100 parts of a fluorescent material. The paste includes fluorescent material particles, a binder, and $SiO_2$ powder dispersed in a solvent. The fluorescent material may be any of the materials ordinarily used for these purposes, typical of which are the following:

$Y_3Al_2Ga_3O_{12}$: Tb (green)
ZnS: Ag (blue)
$Y_2O_3$: Eu (red)

The binder may be a cellulose derivative such as ethyl cellulose, nitrocellulose, and the like, or synthetic resins such as polyvinyl alcohol as is well known in the art. The solvent may be any organic solvent for the binder. The $SiO_2$ is in the form of a fine powder such as the type commercially available under the designation "Aerosil-200" from Rippon Aerosil Co., Ltd. This powder has a particle size range of 8 to 40 milimicrons.

The fluorescent paste is prepared by mixing the above ingredients in a suitable mixer such as a ball mill. The paste is printed onto the inner surface of the face plate 2 to a thickness of 20 to 30 microns, dried, and cooled to form the first layer 11A.

Subsequently, another fluorescent paste which is substantially the same as described above except that the $SiO_2$ content is not larger than 0.3 parts by weight per 100 parts by weight of the fluorescent material is made up. This paste is printed on the sublayer 11A previously deposited to form another layer 11B.

Similarly an intermediate layer 4 is usually formed on the layer 11B by printing a solution of, for example, an acrylic resin followed by drying and vacuum deposition of a metal such as aluminum or the like to form the metal backing layer 5. The face plate 2 is then subjected to baking and bonded to the funnel-shaped portion 6 through a frit sealer 7 to obtain the cathode ray tube 1.

In the above procedure, the fluorescent screen is formed by a printing technique, but it also may be formed by a slurry method as will be described in a succeeding portion of this Specification.

The following examples illustrate the manufacture of a cathode ray tube according to the present invention.

EXAMPLE 1

Fluorescent material pastes of the following formulations were made up comprising $SiO_2$ powder ("Aerosil-200") and were printed on the inner surface of a glass face plate of a cathode ray tube, dried and cooled to form a fluorescent material layer. The fluorescent paste compositions had the following ingredients:

| Fluorescent material | 100 g |
| Ethyl cellulose | 2.5 g |
| Butyl carbitol | 30 g |
| "Aerosil-200" | suitable amounts (including zero) |

The composition of the "Aerosil-200" was as follows:
$SiO_2 > 99.8\%$
$Al_2O_3 > 0.05\%$
$TiO_2 > 0.03\%$
$HCl > 0.01\%$ An intermediate layer of an acrylic resin was printed on the fluorescent material layer and dried, followed by vacuum deposition of the metal backing layer of aluminum. Thereafter, the face plate was baked and bonded to a funnel-shaped portion of the tube through a frit sealer to obtain the cathode ray tube.

The tubes in which the content of $SiO_2$ powder in the fluorescent layer was varied were tested by application of an electric power of 5 w/cm². The separation of the fluorescent screen, i.e., the separation of the fluorescent material layer from the face plate, and the separation of the aluminum backing layer from the fluorescent material layer were observed. The results are shown in the table below:

TABLE 1

| Amount of $SiO_2$ (based on 100 parts by weight of fluorescent material) | 0 part by wt. | 0.3 parts by wt. | 0.6 parts by wt. | 1.2 parts by wt. | 5.0 parts by wt. |
|---|---|---|---|---|---|
| Percent separation of the fluorescent material layer | 45% | 25% | 0% | 0% | 0% |
| Separation of the Al backing layer | no | no | yes | yes | yes |

As is apparent from the above table, when the fluorescent material layer contained not less than 0.6 parts by weight of the $SiO_2$ powder, separation of the fluorescent material layer from the face plate did not occur. When the fluorescent material layer contained not more than 0.3 parts by weight, including none of the $SiO_2$ powder, the separation of the aluminum backing layer from the fluorescent material layer did not take place. It should also be recognized that the aluminum backing layer was not oxidized.

Thus, the fluorescent layer of the present invention should have not less than 0.6 parts by weight of the $SiO_2$ powder per 100 parts by weight of the fluorescent material on the side which contacts the face plate up to an upper limit which is an amount still not sufficient to cause the brightness of the fluorescent material layer to deteriorate, e.g., 3 parts by weight. On the other hand, the opposite side should be free of the $SiO_2$ powder or should contain not more than 0.3 parts by weight per 100 parts by weight of the fluorescent material.

EXAMPLE 2

This Example illustrates the manufacture of the fluorescent screen by a printing technique.

An $SiO_2$ powder containing fluorescent paste of the following formulation was printed on the inner surface of the face plate of a cathode ray tube, followed by drying and cooling the first layer 11A shown in FIGS. 1 and 2.

| Fluorescent material | 100 g |
| Ethyl cellulose | 2.5 g |
| Butyl carbitol | 30 g |
| "Aerosil-200" | 0.6 g or more |

Subsequently, a fluorescent paste free of $SiO_2$ was made up and printed over the first fluorescent layer 11A followed by drying and cooling to form a second layer 11B, thereby providing a double-layer structure. The composition of the fluorescent paste for the second layer was as follows:

| Fluorescent material | 100 g |
|---|---|
| Ethyl cellulose | 2.5 g |
| Butyl carbitol | 30 g |

An intermediate layer was printed on the fluorescent screen and dried after which an aluminum backing layer 5 was vacuum deposited on the intermediate layer 4. After a baking treatment, the face plate was bonded to the funnel-shaped portion 6 through a frit sealer 7 to provide a cathode ray tube 1.

With the above arrangement, the first layer 11A contacting the face plate 2 contained $SiO_2$ and thus insured good adhesion to the face plate 2. The second layer 11B facing the metal backing layer 5 did not contain $SiO_2$ and thus had appropriate irregularities which insured good adhesion to the metal backing layer. The second layer 11B had a very small moisture absorption characteristic such that when a high electric power was applied to the cathode ray tube, the fluorescent screen 11 did not separate from the face plate 2 and the metal backing layer 5 was not attacked.

EXAMPLE 3

This Example illustrates the formation of the fluorescent screen by a slurry method.

In this method, a fluorescent paste containing $SiO_2$ powder in the following formulation was applied onto the surface of the face plate 2, dried, exposed to light according to a predetermined pattern, and developed to form the first layer 11A. The composition for the slurry was:

| Fluorescent material | 100 g |
|---|---|
| Polyvinyl alcohol (PVA) | 5 g |
| Ammonium dichromate (ADC) | 0.5 g |
| "Aerosil-200" | 0.6 or more |
| Water | 100 cc |

Subsequently, another fluorescent slurry having a formulation free of $SiO_2$ was applied onto the first layer 11A, dried, exposed to light with a desired pattern and developed to form the second layer 11B. The composition of the second layer was:

| Fluorescent material | 100 g |
|---|---|
| Polyvinyl alcohol (PVA) | 5 g |
| Ammonium dichromate (ADC) | 0.5 g |

-continued

| Water | 100 cc |
|---|---|

On the fluorescent screen 11 there was further formed an aluminum backing layer 5 through the intermediate layer 4 of an acrylic resin. Thereafter, the face plate was baked and subjected to frit sealing of a funnel-shaped portion to provide the finished cathode ray tube. The fluorescent screen of the cathode ray tube had substantially the same characteristics as that obtained in Example 2.

The fluorescent screen 11 has been described as having two discrete layers in the above examples, but any layer arrangement including one layer or a plurality of layers may be used provided that the $SiO_2$ contents at the side contacting the face plate 2 and the side facing the metal backing layer 5 have the $SiO_2$ contents as described previously.

It will be evident that various modifications can be made to the described embodiments without departing from the scope of the present invention.

We claim as our invention:

1. In a cathode ray tube having a face plate having an outer surface and an inner surface, a fluorescent screen including fluorescent material formed on said inner surface and a metal backing layer backing up said fluorescent screen, the improvement which comprises:
   a fluorescent material composition which includes fluorescent particles and not less than 0.6 parts by weight of $SiO_2$ per 100 parts by weight of fluorescent particles in that portion of the material which contacts said face plate, the amount being insufficient to cause the brightness of said fluorescent particles to deteriorate, and not more than 0.3 parts by weight of $SiO_2$ per 100 parts by weight of fluorescent particles in that portion of said material which faces said metal backing layer.

2. A cathode ray tube according to claim 1 wherein the portion of said material which faces said metal backing layer is substantially free of $SiO_2$.

3. A cathode ray tube according to claim 1 wherein said fluorescent material appears in two discrete layers, a front layer contacting said inner surface of said face plate and containing $SiO_2$ in an amount not less than 0.6 parts by weight per 100 parts by weight of fluorescent particles and a second layer immediately adjacent said first layer and containing not more than 0.3 parts by weight $SiO_2$ per 100 parts by weight of fluorescent particles.

4. A cathode ray tube according to claim 3 wherein said second layer is substantially free of $SiO_2$.

5. A cathode ray tube according to claim 1 which includes an intermediate layer of an acrylic resin interposed between the portion of said fluorescent material which faces said metal backing layer and said metal backing layer.

* * * * *